(12) United States Patent
Jou

(10) Patent No.: US 6,216,332 B1
(45) Date of Patent: Apr. 17, 2001

(54) METHOD OF MANUFACTURING A NON-STICK PAN

(76) Inventor: Ching-Chuan Jou, No. 56., Jiue Tz Tou, Shi-Kang Tsun, Shi-Kang Shiang, Tainan Shien (TW)

( * ) Notice: Subject to any disclaimer, the term of this patent is extended or adjusted under 35 U.S.C. 154(b) by 0 days.

(21) Appl. No.: 09/432,732

(22) Filed: Nov. 2, 1999

(51) Int. Cl.⁷ ....................................................... B05D 3/04
(52) U.S. Cl. .......................................... 29/527.4; 427/348
(58) Field of Search ........................... 29/527.4; 427/239, 427/348, 376.5, 409

(56) References Cited

U.S. PATENT DOCUMENTS

| | | | |
|---|---|---|---|
| 3,825,993 | * | 7/1974 | McGinnis et al. .................. 29/527.4 |
| 4,070,525 | * | 1/1978 | Vasgiliou et al. . |
| 5,694,674 | * | 12/1997 | Flammang .......................... 29/527.4 |

* cited by examiner

Primary Examiner—P. W. Echols
(74) Attorney, Agent, or Firm—Rosenberg, Klein & Lee

(57) ABSTRACT

The present invention provides a method of manufacturing a non-stick pan. The first step is to apply and spread a ceramic and porcelaneous mixture coat and a Teflon coat on the surface of a percussion-molded pan made of non-carbon iron board. The two coats are respectively dealt at different high temperatures and time, and the surface of the ceramic and porcelaneous mixture coat is made to be concave-convex for the Teflon coat to be firmly adhered to. Therefore, the non-stick pan is provided with a strong surface to prevent from being stripped or scratched by a slice or a steel brush.

1 Claim, 1 Drawing Sheet

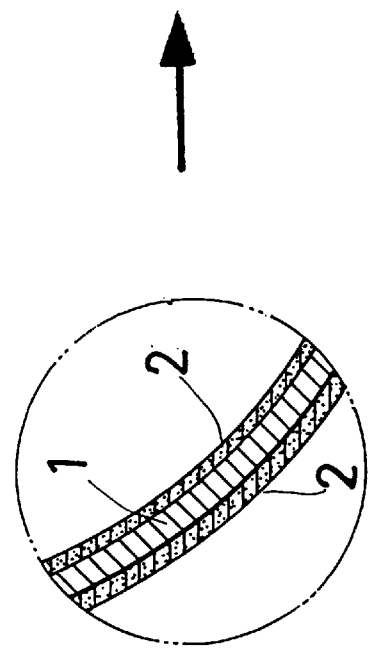
FIG. 1B
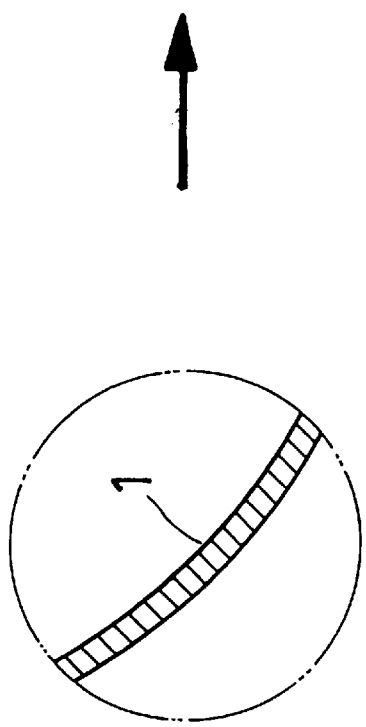
FIG. 1C
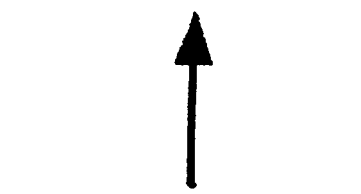
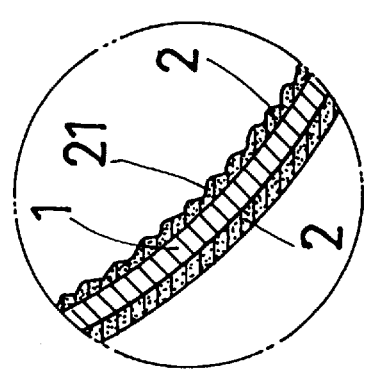
FIG. 1D
FIG. 1A
FIG. 1

METHOD OF MANUFACTURING A NON-STICK PAN

BACKGROUND OF THE INVENTION

1. Field of the Invention

The present invention relates to a method of manufacturing a non-stick pan with innovative wear-resisting and non-stick features, and more particularly to a method of manufacturing a non-stick pan whose surface of Teflon coat is hard and wear-resisting so as not to be destroyed through a long time of use.

2. Description of the Related Art

A conventional pan is made of iron board, and on the surface of the iron board is painted with a coat of paint or Teflon after the pan being formed. After being used for a period of time, the paint or Teflon coat adhered to the surface of the conventional pan will be stripped or scratched by a slice or a steel brush. The stripped or scratched paint or Teflon will be easily stuck to the food being cooked in the pan so as to be eaten by persons and result in accidents. Besides, the stripped or scratched portions of the pan surface will be easily stuck by cooked food and rusted so as to shorten the using life of the pan.

SUMMARY OF THE INVENTION

Therefore, the present invention is to provide a method of manufacturing a non-stick pan that substantially obviates the drawbacks of the related conventional art.

An object of the present invention is to provide a method of manufacturing a non-stick pan that is provided with a strong surface to prevent from being worn by a slice or a steel brush.

Another object of the present invention is to provide a method of manufacturing a non-stick pan that is provided with a Teflon coat adhered to a ceramic and porcelaneous mixture coat so as to protect the pan from being stripped or scratched and make the pan be used for a longer time.

Yet another object of the present invention is to provide a method of manufacturing a non-stick pan that can prevent the food cooked in the pan from being stuck by harmful material so as to ensure the safety of persons.

To achieve these advantages, the present invention provides a method of manufacturing a non-stick pan. The first step is to apply and spread a ceramic and porcelaneous mixture coat and a Teflon coat on the surface of a percussion-molded pan made of non-carbon iron board. The two coats are respectively dealt at different high temperatures and time, and the surface of the ceramic and porcelaneous mixture coat is made to be concave-convex for the Teflon coat to be firmly adhered to. Therefore, the nonstick pan is provided with a strong surface to prevent from being stripped or scratched by a slice or a steel brush.

BRIEF DESCRIPTION OF THE DRAWINGS

Other features and advantages of the present invention will become apparent in the following detailed description of the preferred embodiments with reference to the accompanying drawings, in which FIG. 1 is a series of sectional views showing the steps of manufacturing a non-stick pan in accordance with the present invention;

FIG. 1A is a sectional view showing a pan formed and made of non-carbon iron board in accordance with the present invention;

FIG. 1B is a sectional view showing both surfaces of the iron board being respectively painted with a ceramic and porcelaneous coat in accordance with the present invention;

FIG. 1C is a sectional view showing the inner ceramic and porcelaneous coat being struck by air-pressure to form a concave-convex surface in accordance with the present invention; and, FIG. 1D is a sectional view showing the concave-convex ceramic and porcelaneous coat being adhered to by a coat of Teflon in accordance with the present invention.

DETAILED DESCRIPTION OF THE PREFERRED EMBODIMENTS

Referring to FIG. 1, the method of manufacturing a non-stick pan in the present invention includes the following steps:

A: Mold a non-carbon iron board 1 by percussive pressure to be a prefabricated form;

B: Degrease the inner and outer surfaces of the iron board 1 about 20 minutes before painting a ceramic and porcelaneous coat, continuously heat the iron board 1 as to 900° C. and then let the iron board 1 cool off itself;

C: Evenly paint ceramic and porcelaneous mixture, made from silica, porcelain clay and pigment, on the inner and outer surfaces of the iron board 1 about 0.3 mm in thickness to make the half-finished pan be coated by ceramic and porcelaneous mixture coat 2, the composition of the ceramic and porcelaneous mixture coat 2 being $Na_2O$ (13.6%), $K_2O$ (6%), $Si_2O$ (36.7%), $B_2O_3$ (20.1%), $F_2$ (4.3%), $CaO$ (9.3%), $Al_2O_3$ (4.1%), $BaO$ (3.2%), $NiO$ (2.7%);

D: Heat the half-finished pan as to 900° C. about 20 minutes and then let the half-finished pan cool off itself to make the ceramic and porcelaneous mixture coat 2 be firmly adhered to the non-carbon iron board 1;

E: Strike the inner surface of the percussion-molded pan by air-pressure to make the surface of the inner ceramic and porcelaneous mixture coat 2 to form an irregular concave-convex surface 21;

F: Wash, degrease and dry the concave-convex surface 21 of the ceramic and porcelaneous mixture coat 2;

G: paint and spread Teflon paint on the concave-convex surface 21 about 12~15µ in thickness; and, H: Heat the inner surface of the pan as to 400° C. for 35 minutes to make the Teflon paint be firmly adhered to the concave-convex surface 21 and form a Teflon coat 3.

While the preferred embodiments of the invention have been described above, it will be recognized and understood that various modifications may be made therein and the appended claims are intended to cover all such modifications which may fall within the spirit and scope of the invention.

What is claimed is:

1. A method of manufacturing a non-stick pan comprising

A: molding a non-carbon iron board by percussive pressure to be a prefabricated from;

B: degreasing inner and outer surfaces of said iron board at the temperature of 900° C. for 20 minutes;

C: painting ceramic and porcelaneous mixture, made from silica, porcelain clay and pigment, on said inner and outer surfaces of said iron board about 0.3 mm in thickness to form ceramic and porcelaneous mixture coat, the composition of said ceramic and porcelaneous mixture coat being $Na_2O$ (13.6%), $K_2O$ (6%), $Si_2O$ (36.7%), $B_2O_3$ (20.1%), $F_2$ (4.3%), $CaO$ (9.3%), $Al_2O_3$ (4.1%), $BaO$ (3.2%), $NiO$ (2.7%);

D: heating the pan as to 800~900° C. for 20 minutes;

E: striking said inner surface of said pan by air-pressure to make the surface of said inner ceramic and porcelaneous mixture coat to form a concave-convex surface;

F: washing, degreasing and drying said concave-convex surface of said ceramic and porcelaneous mixture coat;

G: painting and spreading Teflon® paint on said cave-convex surface about 12~15µ in thickness; and, H: heating inner surface of said pan to 400 C for minutes to make said Teflon paint be firmly adhered to concave-convex surface and form a Teflon® coat.

* * * * *